US006788310B1

(12) United States Patent
Politis

(10) Patent No.: US 6,788,310 B1
(45) Date of Patent: Sep. 7, 2004

(54) DETERMINING A DISPLAYABLE COLOR IN A SELF-OVERLAPPING REGION OF A COLOR OBJECT

(75) Inventor: George Politis, Macquarie Fields New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/459,946

(22) Filed: Dec. 14, 1999

(30) Foreign Application Priority Data

Dec. 14, 1998 (AU) .............................................. PP7717

(51) Int. Cl.[7] ................................................ G06F 11/00

(52) U.S. Cl. ........................ 345/630; 345/592; 345/629

(58) Field of Search ................................ 345/629, 630, 345/592

(56) References Cited

U.S. PATENT DOCUMENTS

| | | | | | |
|---|---|---|---|---|---|
| 4,901,251 | A | * | 2/1990 | Sfarti | 345/441 |
| 5,043,711 | A | * | 8/1991 | Harrington | |
| 5,115,402 | A | * | 5/1992 | Matsushiro et al. | |
| 5,231,695 | A | * | 7/1993 | Harrington | |
| 5,347,619 | A | * | 9/1994 | Erb | 345/441 |
| 5,361,333 | A | * | 11/1994 | Ahlquist, Jr. et al. | |
| 5,438,656 | A | * | 8/1995 | Valdes et al. | |
| 5,450,534 | A | * | 9/1995 | Ichikawa | |
| 5,831,622 | A | | 11/1998 | Ayala | 345/423 |
| 6,034,694 | A | * | 3/2000 | Evans et al. | |
| 6,084,596 | A | | 7/2000 | Politis | 345/435 |
| 2003/0016221 | A1 | | 1/2003 | Long et al. | 345/441 |

FOREIGN PATENT DOCUMENTS

| | | |
|---|---|---|
| AU | 31780/95 | 3/1996 |

OTHER PUBLICATIONS

Foely et al., Computer Graphics Principles and Practice, Second Edition in C, Addison–Wesley, Jul. 1997, pp. 835–842 and& 964–965.*

William M. Newman and Robert F. Sproull, PRINCIPLES OF INTERACTIVE COMPUTER GRAPHICS, 1979, McGraw–Hill Book Company, pp. 389, 404–409, 515 and 525.*

Thomas Porter and Tom Duff, COMPOSITING DIGITAL IMAGES. Jul. 1984, ACM, Computer Graphics, vol. 18, No. 3, pp. 253–259.*

* cited by examiner

*Primary Examiner*—Jeffery Brier

(74) *Attorney, Agent, or Firm*—Fitzpatrick, Cella, Harper and Scinto

(57) ABSTRACT

Determining a displayable color in a self-overlapping region of a variable color object by determining for each point in the region, the color of each portion of the object present at that point. At each point averaging the colors present at that point and outputting the averaged colors for reproduction within the region.

52 Claims, 6 Drawing Sheets

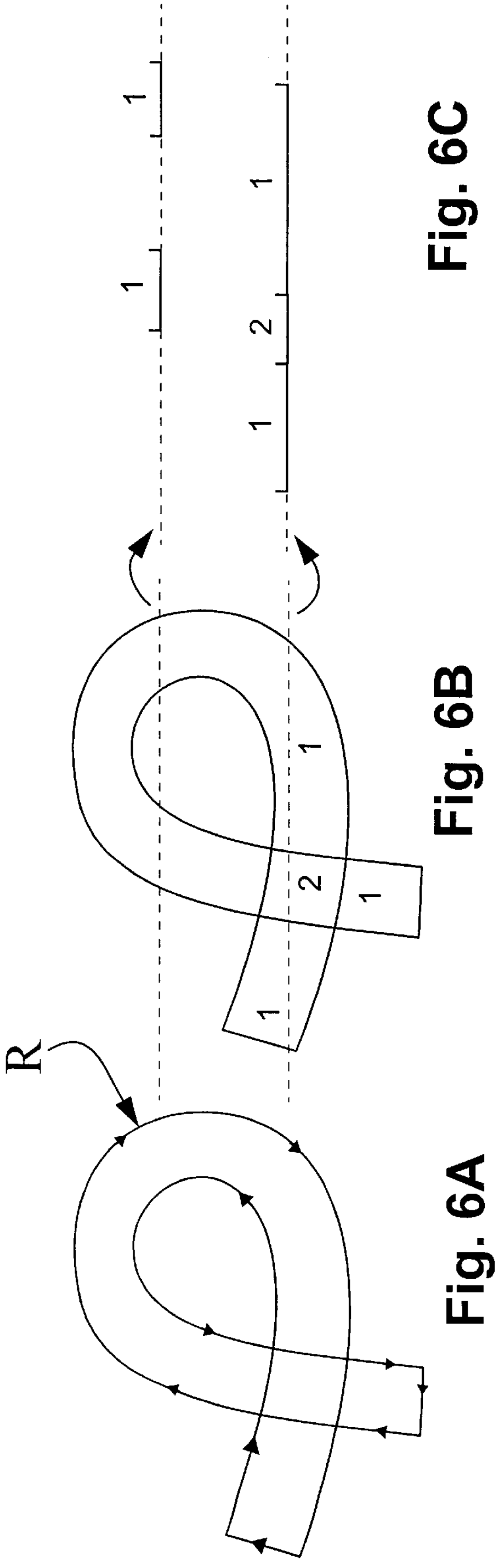
Fig. 6A
Fig. 6B
Fig. 6C
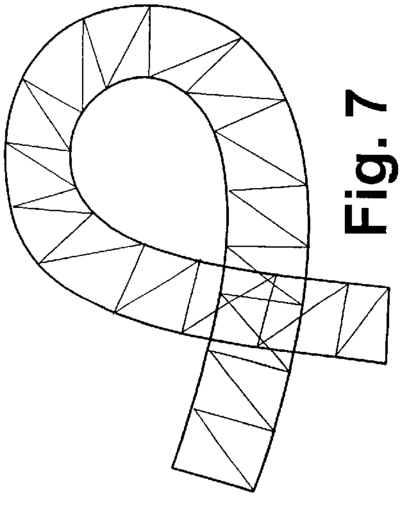
Fig. 7
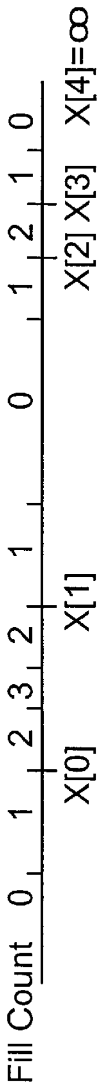
Fig. 8

DETERMINING A DISPLAYABLE COLOR IN A SELF-OVERLAPPING REGION OF A COLOR OBJECT

FIELD OF THE INVENTION

The present invention relates to computer graphics and, in particular, to the generation of overlapping texture mapped regions, including parametrically defined colour blends.

BACKGROUND

The display of graphical objects involves considering many issues which influence various aspects of the image being displayed. Examples of such issues include the actual colour being displayed and the time taken to determine (render) the colour to be displayed. Where graphical objects are opaque, these issues are relatively simple. However, transparent and partly transparent objects complicate issues, particularly where the colour and/or opacity of an object changes or varies within the object boundaries. Specific problems arise where an object is self-overlapping and the displayed colour is a textural blend of varying colours from the overlapping portions.

It is an object of the present invention to provide a manner in which such self-overlapping regions may be faithfully rendered in a convenient fashion.

SUMMARY OF THE INVENTION

In accordance with one aspect of the present invention there is disclosed a method of determining a displayable colour in a self-overlapping region of a variable colour object, said method comprising the steps of:

determining, for each point in the region, the colour of each portion of the object present at that point;

at each said point, averaging the colours present at that point; and outputting said averaged colours for reproductions within said region.

In accordance with another aspect of the present invention there is disclosed a method of determining a displayable colour in a self-overlapping region of a variable colour object characterised by the use of a commutative operator that mixes a plurality of colours in an order independent manner.

In accordance with another aspect of the present invention there is disclosed a commutative operator for mixing colours having opacity components, said operator being of the form:

$$\left(\frac{\sum c_i o_i / n}{\sum o_i / n}, \overset{n}{\underset{i=1}{\text{over}}} o_i\right) = \left(\frac{\sum c_i o_i}{\sum o_i}, \overset{n}{\underset{i=1}{\text{over}}} o_i\right),$$

where $$\overset{n}{\underset{i=1}{\text{over}}} o_i = \sum_{i=1}^{n} o_i \prod_{j=i+1}^{n} (1 - o_i),$$

In accordance with another aspect of the present invention there is disclosed a method of determining self-overlapping regions of a graphical object, characterised by using the non-zero winding fill rule to accumulate edge transitions of said object in a scan line by scan line fashion.

In accordance with another aspect of the present invention there is disclosed a method for rendering in a scan-line manner an arbitrary object having at least overlapping region, said method comprising the steps of:

for each scan line of said object (a) scan converting the object on said scan line (b) determining the overlapping regions of said object within said scan line;

(c) initializing a overlap buffer for each said overlapping regions (d) for each portion of the object on said scan line (da) determining if said portion is an overlapping region (daa) if so, accumulating the colour of pixels of said portion in the corresponding said overlap buffer;

(dab) if not, writing the colour of pixels to an output buffer;

(e) for each overlapping region, calculating an average colour from the corresponding accumulated value in said corresponding overlap buffer;

(f) writing the average colours to said output buffer; and (g) transferring values from said output buffer to an output device.

In accordance with another aspect of the present invention there is disclosed an apparatus for determining a displayable colour in a self-overlapping region of a variable colour object, said apparatus comprising:

colour determination means for determining, for each point in the region, the colour of each portion of the object present at that point;

averaging means, responsive to said colour determination means, adapted to average, at each said point, the colours present at that point; and output means coupled to said averaging means for outputting said averaged colours for reproductions within said region.

In accordance with another aspect of the present invention there is disclosed an apparatus for determining a displayable colour in a self-overlapping region of a variable colour object characterised by comprising a commutative operator means adapted to mix a plurality of colours in an order independent manner.

In accordance with another aspect of the present invention there is disclosed a commutative operator means for mixing colours having opacity components, said operator means adapted to perform the operation:

$$\left(\frac{\sum c_i o_i / n}{\sum o_i / n}, \overset{n}{\underset{i=1}{\text{over}}} o_i\right) = \left(\frac{\sum c_i o_i}{\sum o_i}, \overset{n}{\underset{i=1}{\text{over}}} o_i\right),$$

where $$\overset{n}{\underset{i=1}{\text{over}}} o_i = \sum_{i=1}^{n} o_i \prod_{j=i+1}^{n} (1 - o_i),$$

In accordance with another aspect of the present invention there is disclosed an apparatus for determining self-overlapping regions of a graphical object, characterised by comprising a non-zero winding fill rule means to accumulate edge transitions of said object in a scan line by scan line fashion.

In accordance with another aspect of the present invention there is disclosed an apparatus for rendering in a scan-line manner an arbitrary object having at least overlapping region, said apparatus comprising:

for each scan line of said object (a) scan conversion means for scan converting the object on said scan line (b) overlapping region detection means for determining the overlapping regions of said object within said scan line;

(c) buffer initialization means for initializing an overlap buffer for each said overlapping regions (d) overlapping region determination means, operative in respect of each portion of the object on said scan line (da) for determining if said portion is an overlapping region (daa) and, if said portion is an overlapping region, adapted to accumulate the colour of pixels of said portion in the corresponding said overlap buffer;

(dab) and, if said portion is not an overlapping region, adapted to write the colour of pixels to an output buffer;

(e) calculation means, operative in respect of each overlapping region, to calculate an average colour from the corresponding accumulated value in said corresponding overlap buffer;

(f) writing means for writing the average colours to said output buffer; and (g) transferring means for transferring values from said output buffer to an output device.

In accordance with another aspect of the present invention there is disclosed a computer program product including a computer readable medium incorporating a series of instructions configured to determine a displayable colour in a self-overlapping region of a variable colour object, said instructions comprising:

determination steps for determining, for each point in the region, the colour of each portion of the object present at that point;

averaging steps for at each said point, averaging the colours present at that point; and outputting steps for outputting said averaged colours for reproductions within said region.

In accordance with another aspect of the present invention there is disclosed a computer program product for determining a displayable colour in a self-overlapping region of a variable colour object characterised by comprising commutative operator steps adapted to mix a plurality of colours in an order independent manner.

In accordance with another aspect of the present invention there is disclosed a computer program product comprising commutative operator steps for mixing colours having opacity components, said operator steps adapted to perform the operation:

$$\left(\frac{\sum c_i o_i / n}{\sum o_i / n}, \operatorname*{over}_{i=1}^{n} o_i\right) = \left(\frac{\sum c_i o_i}{\sum o_i}, \operatorname*{over}_{i=1}^{n} o_i\right),$$

where $$\operatorname*{over}_{i=1}^{n} o_i = \sum_{i=1}^{n} o_i \prod_{j=i+1}^{n} (1 - o_i),$$

In accordance with another aspect of the present invention there is disclosed a computer program product for determining self-overlapping regions of a graphical object, characterised by comprising non-zero winding fill rule steps to accumulate edge transitions of said object in a scan line by scan line fashion.

In accordance with another aspect of the present invention, there is provided computer program product for rendering in a scan-line manner an arbitrary object having at least overlapping region, said program comprising:

for each scan line of said object (a) scan conversion steps for scan converting the object on said scan line (b) overlapping region detection steps for determining the overlapping regions of said object within said scan line;

(c) buffer initialization steps for initializing a overlap buffer for each said overlapping regions (d) overlapping region determination steps, operative in respect of each portion of the object on said scan line (da) for determining if said portion is an overlapping region (daa) and, if said portion is an overlapping region, adapted to accumulate the colour of pixels of said portion in the corresponding said overlap buffer;

(dab) and, if said portion is not an overlapping region, adapted to write the colour of pixels to an output buffer;

(e) calculation steps, operative in respect of each overlapping region, to calculate an average colour from the corresponding accumulated value in said corresponding overlap buffer;

(f) writing steps for writing the average colours to said output buffer; and (g) transferring steps for transferring values from said output buffer to an output device.

BRIEF DESCRIPTION OF THE DRAWINGS

A number of aspects of the prior art and a number of embodiments of the present invention will now be described with reference to the drawings in which:

FIGS. 6A to 6C depict how the non-zero winding rule may be applied to the regions of FIG. 4;

FIG. 7 depicts application of the mesh techniques to the rendering of FIG. 4 and highlights mesh elements that are affected by self-overlap;

FIG. 8 depicts a set of scan line runs generated using the winding counting fill rule and a generated array of transition points;

DETAILED DESCRIPTION

Prior to discussing the present invention and its embodiments, it is appropriate to review current techniques for rendering texture mapped regions.

Figure 1A:
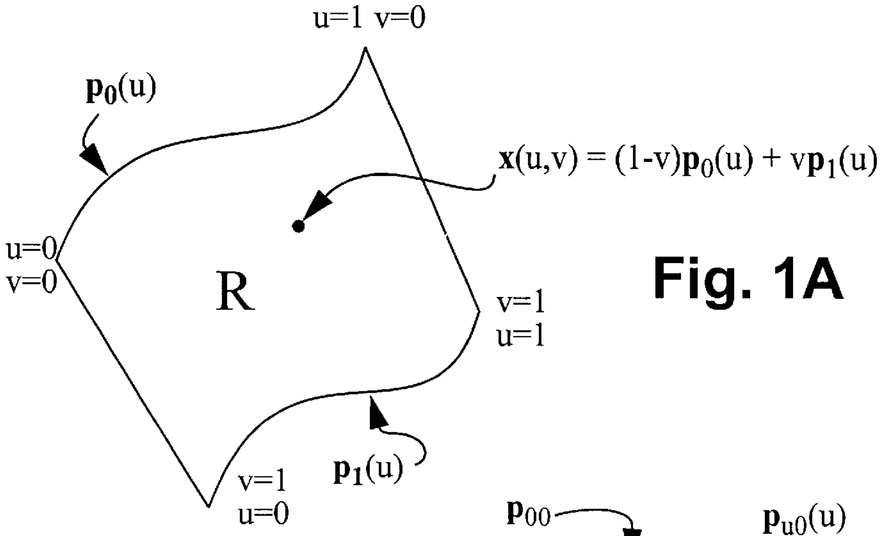
FIGS. 1A and 1B depict prior art two-dimensional parameterized regions.
Figure 1B:
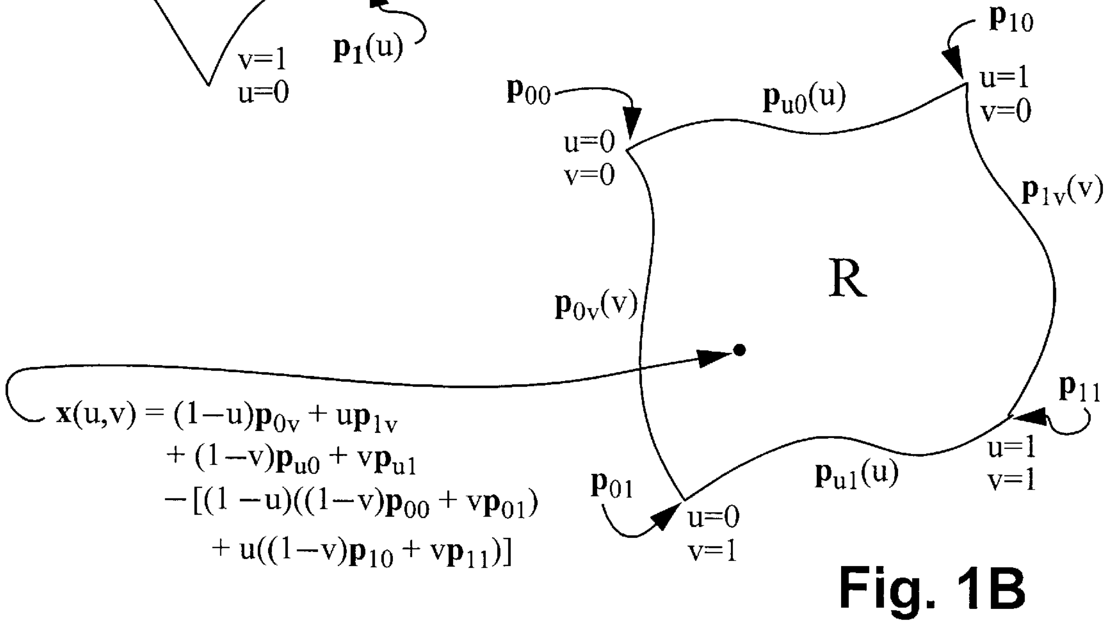
Figure 2A:
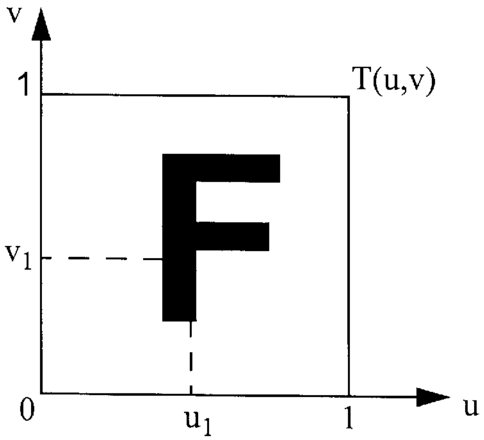
FIGS. 2A and 2B depict a prior art distortion to an image.
Figure 2B:
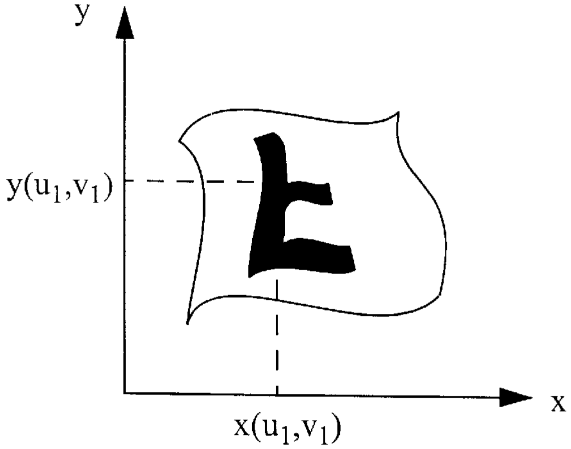

Given (i) a region of space R over which a two-dimensional (2-D) parameterization x(u,v)=(x(u,v),y(u,v)) is defined, for example, a ruled surface as in FIG. 1A, or a Coons patch as in FIG. 1B, and (ii) some image, texture map, blend procedural texture or the like T(u,v) that yields colour (and/or opacity value) for given (u,v) in suitable range, it is possible to create an image distortion or curved colour blend or the like, by taking the colour T(u,v) at each (u,v) value and drawing it at position x(u,v), as illustrated in FIGS. 2A and 2B.

Conversely, it is possible to determine the (u,v) value for each point x in the region R, look up the colour T(u,v) at (u,v), and draw it at x. This presupposes that the mapping x(u,v) is invertible and can be inverted with sufficient ease.

An alternative approach that has been used is to provide T(u,v), an inverse distortion (u,v)=u(x,y), and to derive the colour at each (x,y) by first deriving (u,v), then looking up T(u,v), then drawing the colour at x=(x,y). In this scheme, the region defined by u acts like a "cookie" section cutter on T, then distorts the cut (cookie) section into a rectangle. This approach has the advantage that an easily invertible mapping is not required. However, it is not easy with this method to take a rectangular shape and distort it into a required irregular shape, as seen in FIG. 2B.

Figure 3A:
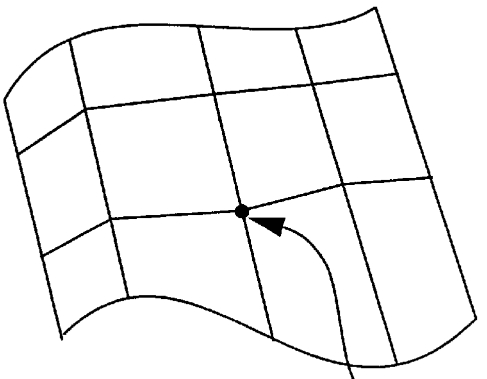
FIGS. 3A and 3B depict a prior art mesh technique used to improve speed of rendering at the expense of quality.
Figure 3B:
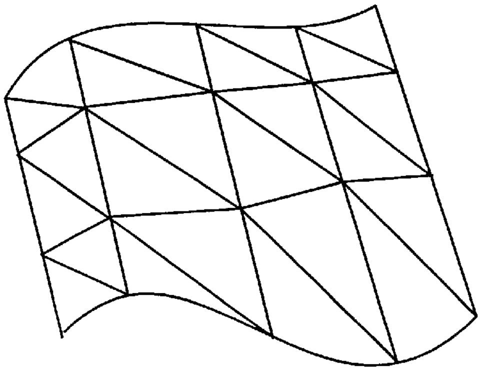

A common technique employed to improve the speed of such techniques is to divide the parameterized region R into a mesh of points at which the parameterization is calculated, an example of which is seen in FIGS. 3A and 3B. The colour can be looked up in T at the mesh points and then linearly interpolated. The finer the mesh, the better the quality, but the slower the rendering. As shown in FIG. 3B, the mesh is often subdivided into triangles, which are the simplest polygon to render.

Figure 4:
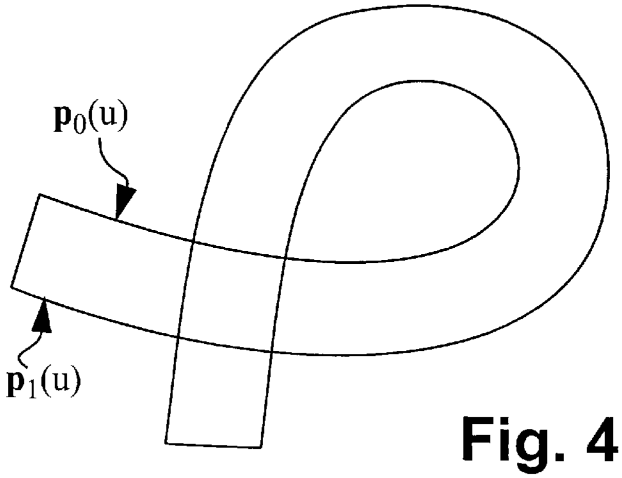
FIG. 4 depicts an overlapping ruled surface to which an embodiment of the present invention may be applied.

One difficulty with the first approach (where x(u,v) and T(u,v) are given) is that the region x(u,v) may self-overlap, as illustrated in FIG. 4. In this case, x(u,v) has no unique inverse within the overlapping region, with two competing choices for the correct colour.

Where the overlapping shape is a two-dimensional projection of a three-dimensional object, each point will have a distance from the viewpoint. A variety of algorithms exist for determining which point in a region of overlap is the one closest to the viewpoint, and whose colour is thus typically chosen as the one to render at that point.

In situations where alpha-channel compositing is available, however, it is possible to define a sensible colour for the overlapping region. Suppose there are two overlapping objects, one with colour $c_1$, and opacity $o_1$, and the other with colour $c_2$ and opacity $O_2$. In practice, three colour channels, e.g., ($R_1$, $G_1$, $B_1$) and ($R_2$, $G_2$, $B_2$) may be used. For simplicity, and without loss of generality, one channel will only be considered. The colour and opacity can be stored together as a tuple (c,o). It is customary in alpha-channel compositing to store the colour and the opacity multiplied together, thus representing the two colours as $\langle c_1o_1,o_1\rangle$ and $\langle c_2o_2,o_2\rangle$. (In mathematical expressions, angle brackets will be used here to notate these "premultiplied" colours).

A commonly used effect that simulates the superposition of one object on the other is provided by the "over" operator:

$$\langle c_1o_1,o_1\rangle \text{ over } \langle c_2o_2,o_2\rangle=\langle c_1o_1+(1-o_1)c_2o_2,\ o_1+o_2-o_1o_2\rangle.$$

Note that this operator is not commutative, that is, in general, $$\langle c_1o_1,o_1\rangle \text{ over } \langle c_2o_2,o_2\rangle\neq\langle c_2o_2,o_2\rangle \text{ over } \langle c_1o_1,o_1\rangle.$$

In other words, given a series of two or more objects, the order in which they are superposed is significant. However, it is worthwhile noting that the resulting opacity is independent of the order of the objects.

Returning to the difficulty of overlapping regions, at any point p where over parameterized region R overlaps itself such as seen in FIG. 4, there are two or more sets of parametric coordinates that map to p:

$$p=x(u_1,v_1)=x(u_2,v_2)=\ldots$$

It is possible to obtain, from these parametric coordinates, a set of competing colours that contribute to the net colour at p in some way:

$$\langle c_1o_1,o_1\rangle=T(u_1,v_1),$$

$$\langle c_2o_2,o_2\rangle=T(u_2,v_2),$$

. . . .

Combining these colours using the "over" operator may be unsuitable because it implies an ordering. Unless some specific application dictates an ordering, such as one based upon parameterization, in general none is imposed by the geometry or other intrinsic aspect of this process.

Addressing this issue, in accordance with the present invention, a number of embodiments are proposed that permit calculation of the overlapping area to obtain a textured result.

A first embodiment presents the opacity-weighted average:

$$\left\langle \frac{\sum c_i o_i}{n}, \frac{\sum o_i}{n} \right\rangle \tag{1}$$

where n is the number of parametric coordinates $(u_i,v_i)$ that map to the point p in question. Expression (1) has the effect of mixing the contributing colours and averaging their opacities. An important advantage of averaging $c_io_i$ rather than $c_i$ is that colours that are nearly transparent contribute only in a small way to the result, while nearly opaque colours contribute significantly. Thus, for example, while mixing 50% transparent red and 50% transparent yellow should give orange, a nearly opaque red mixed with a barely visible yellow should yield a colour not far from red.

The simpler form $$\left( \frac{\sum c_i}{n}, \frac{\sum o_i}{n} \right)$$

is possible if desired in some application.

Secondly, a more sophisticated approach is to mix the colour as in Expression (1), but to simulate the effect of "over" in increasing the opacity as more and more contributing colours are superposed using the following Expression No. (2):

$$\left( \frac{\sum c_i o_i / n}{\sum o_i / n}, \mathop{\text{over}}_{i=1}^{n} o_i \right) = \left( \frac{\sum c_i o_i}{\sum o_i}, \mathop{\text{over}}_{i=1}^{n} o_i \right), \tag{2}$$

where $$\overset{n}{\underset{i=1}{\text{over}}}\ o_i = \sum_{i=1}^{n} o_i \prod_{j=i+1}^{n} (1 - o_j),$$

i.e., the opacity of $<x,o_1>$ over $<x, o_2>$. . . over $<x, o_n>$. An advantage of this second, albeit more complicated method, is shown in FIGS. 5A, 5B and 5C.

Figure 5A:
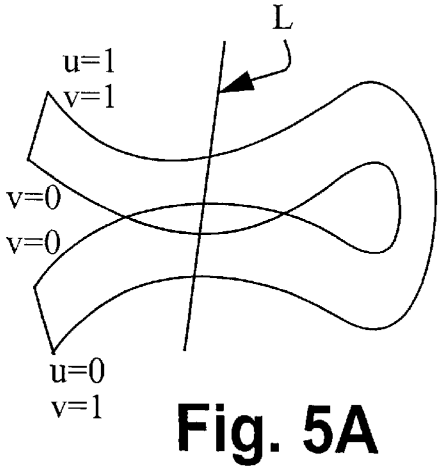
FIG. 5A depicts another ruled surface.
Figure 5B:
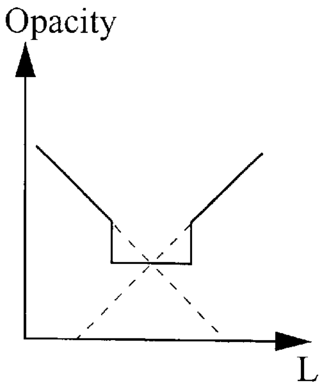
FIGS. 5B and 5C depict application of the embodiments to the regions of FIG. 5A.
Figure 5C:
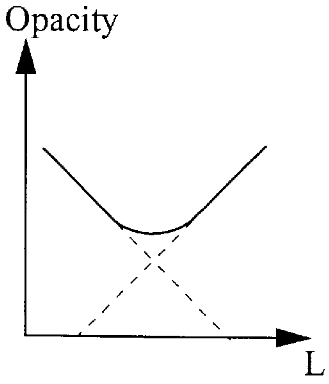

FIG. 5A shows a ruled surface in which opacity o(u,v)=v. FIG. 5B shows an opacity profile along line L of FIG. 5A derived by averaging contributing opacities (as per Expression (1)). FIG. 5C shows an opacity profile along line L of FIG. 5A derived by accumulating contributing opacities with "over" (as per Expression (2)). As can be seen, Expression (2) yields a result without the discontinuities of FIG. 5B.

A description of how such techniques can be implemented follows, with primary emphasis on scan line rendering. The methods described can be generalised easily to band or frame buffer rendering.

The simplest approach is to store, for each pixel, running sums $$C = \sum_{i=1}^{k} c_i o_i,$$

$$A = \sum_{i=1}^{k} o_i k,$$

and, for the second method, $$B = \overset{k}{\underset{i=1}{\text{over}}} o_i.$$

Initially, for every pixel the values are set such that A=B=C=k=0.

As each pixel is rendered by whatever means, for example by dividing the region into a mesh and linearly interpolating intermediate colours, A, B and C are accumulated, and k is incremented. When rendering is finished, Expression (1) or (2) is calculated:

$$\left\langle \frac{\sum c_i o_i}{n}, \frac{\sum o_i}{n} \right\rangle = \left\langle \frac{C}{k}, \frac{A}{k} \right\rangle \tag{3}$$

or $$\left( \frac{\sum c_i o_i}{\sum o_i}, \underset{i}{\text{over}}\ o_i \right) = \begin{cases} \left( \frac{C}{A}, B \right), & A \neq 0 \\ (0, 0) & A = 0. \end{cases} \tag{4}$$

An inefficiency with this technique is that in regions where there is only one contributing colour, extra storage and complicated arithmetic are not needed for evaluation. If the regions where overlaps occur can be identified, it is then possible to limit the storage and calculation of running sums and final division to the pixels within those regions. Pixels outside can be written into a scan line (or frame, etc.) buffer directly.

One method for identifying those regions is to generate an outline for the region R and scan convert the region R using the non-zero winding method and maintaining a count of the number of contributing colours in a region. This will provide, for each scan line, information about which pixels have one contributing region, two contributing regions, and so on, as seen in FIGS. 6A to 6C.

FIG. 6A shows a directed outline derived from the ruled surface R of FIG. 4. Applying scan conversion using the non-zero winding method returns the number of portions of R that contribute to each pixel, as shown in FIG. 6B. On each scan line, as seen in FIG. 6B, non-zero winding scan conversion identifies a series of segments each having an associated count as seen in FIG. 6C.

In the case where the region R has been subdivided into a mesh and linear interpolation applied, care must be taken in cases where a sequence of linearly interpolated pixels cross a boundary of a segment returned by the "non-zero winding" method of scan conversion. FIG. 7 illustrates an example where this happens, with a triangular mesh derived from the ruled surface of FIG. 4. The shaded triangles span regions with different winding count, as seen from FIG. 6. In those cases, the linear interpolation must be broken into two (or more, as required) loops. The portions relating to winding count 1 are determined simply by writing the interpolated colours, while those with greater winding count are determined by accumulating partial sums (and later calculating the final colour and opacity).

Further details may now be discussed about how rendering would take place.

For each scan line, a set of runs is returned from the scan conversion of the outline of region R, as in FIG. 6C. These can be processed into a set of transition points where the fill count changes between less than 2 and 2 or more, with the transition points stored in an array, X, as shown in FIG. 8. It will be observed that regions with fill count of 2 or more lie between points in array X indexed by even numbers and points indexed. An additional final entry containing a very large number (denoted ∞) is required by the method described above.

A scan line without any occurrence of fill count 2 or more only has X[0]=∞.

The next thing to do is to initialize buffers in regions where the fill count is 2 or more.

When rendering each triangle, the process described by the following pseudocode may be implemented.

```
Determine x_start, x_end, the range of pixels in the current scan line required to
    fill the triangle
    i ← 0
    while x_start ≧ X[i] do Increment i
    while x_end ≧ X[i] do
    begin
        if is odd then
            Generate data for pixels x_start to X[i] − 1 and
```

-continued

```
                    accumulate data in buffers, for example, sums A, B, C and
                    k defined above.
        else
            Generate data for pixels x_start to X[i] - 1 and
                    write data directly into output buffer.
        x_start <- X[i]
        Increment i
end
if i is odd then
            Generate data for pixels x_start to x_end - 1 and
                    accumulate data in buffers, for example, sums A, B, C
                    and k defined above.
        else
            Generate data for pixels x_start to x_end - 1 and
                    write data directly in output buffer.
```

After all triangles have been rendered, calculate output pixels can be determined for regions where the fill count is 2 or more, for example, by evaluating Expression (1) or (2) using terms A, B, C and k.

An alternative to $$\underset{i=1}{\overset{n}{over}}\, o_i$$

for opacity is simply $$\sum_{i=1}^{n} o_i,$$

clamped at the maximum opacity, usually defined to be 1.

It will be apparent from the foregoing that a means for generating overlapping texture mapped regions and in particular overlapping parametrically defined colour blends is provided that affords practical results whilst keeping the amount of memory and processing comparable to prior art methods. The various alternatives for texture determination may be selected depending upon specific requirements of the desired result.

Figure 9:
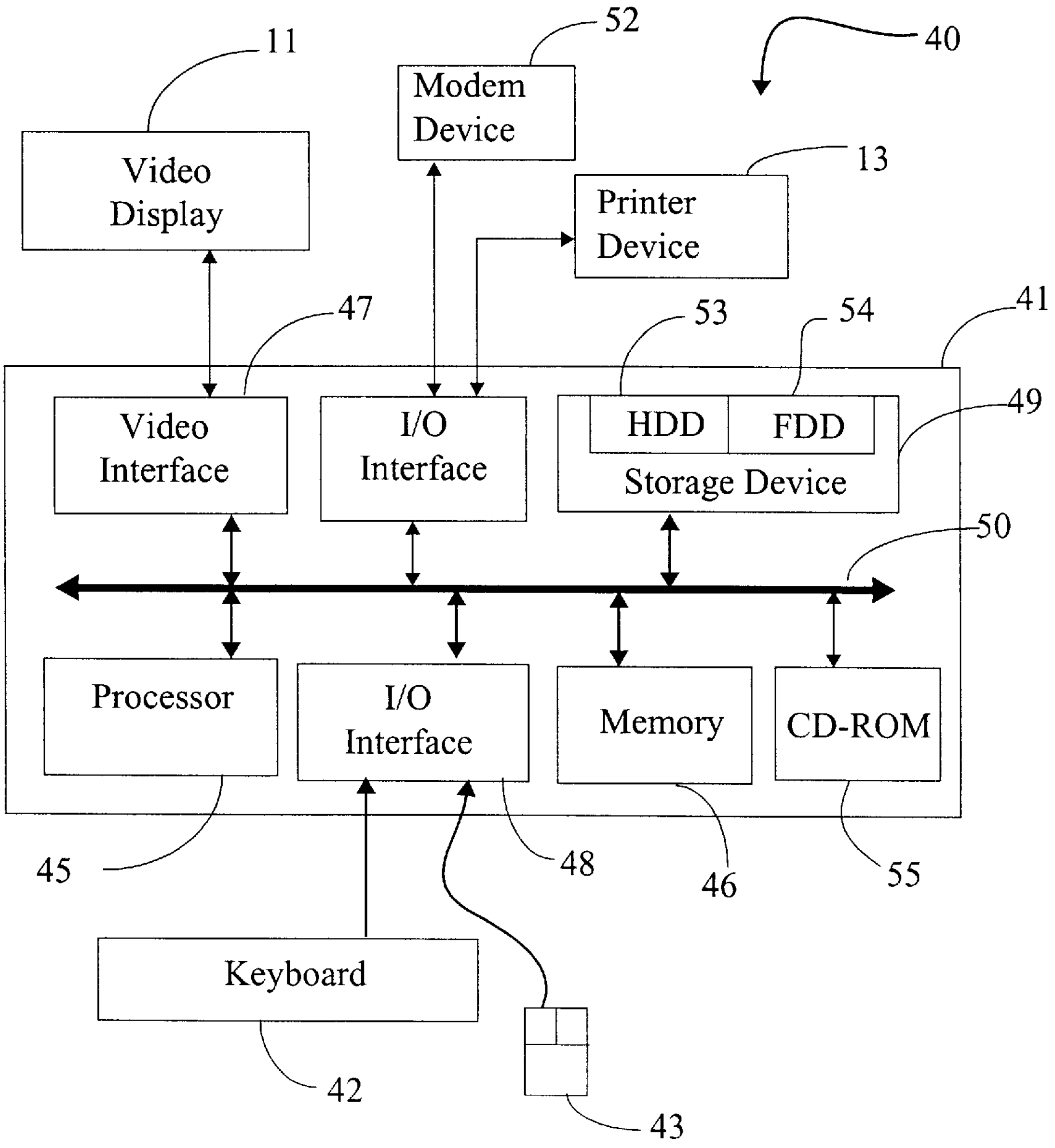
FIG. 9 is a block diagram of a general purpose computer upon which the preferred embodiment of the present invention can be practiced.

The preferred embodiment of the invention can be practised using a conventional general-purpose (host) computer system, such as the computer system 40 shown in FIG. 9, wherein the various method steps performed are implemented as an application program software executed on the computer system 40. The computer system 40 comprises a computer module 41, input devices such as a keyboard 42 and mouse 43, output devices including a printer 13 and a display device 11. A Modulator-Demodulator (Modem) transceiver device 52 is used by the computer module 41 for communicating to and from a communications network, for example, connectable via a telephone line or other functional medium. The modem 52 can be used to obtain access to the Internet, and other network systems.

The computer module 41 typically includes at least one processor unit 45, a memory unit 46, for example, formed from semiconductor random access memory (RAM) and read only memory (ROM), input/output (I/O) interfaces including a video interface 47, and an I/O interface 48 for the keyboard 42, a mouse 43 and optionally a joystick (not illustrated). A storage device 49 is provided and typically includes a hard disk drive 53 and a floppy disk drive 54. A CD-ROM drive 55 is typically provided as a non-volatile source of data. The components 45 to 49 and 53 to 55 of the computer module 41, typically communicate via an interconnected bus 50 and in a manner which results in a conventional mode of operation of the computer system 40 known to those in the relevant art. Examples of computers on which the embodiments can be practised include IBM-PC's and compatibles, Sun Sparcstations or alike computer systems evolved therefrom. Typically, the application program of the preferred embodiment is resident on a hard disk drive 53 and read and controlled using the processor 45. Intermediate storage of the program and the print list and any data fetched from the network may be accomplished using the semiconductor memory 46, possibly in concert with the hard disk drive 53. In some instances, the application program may be supplied to the user encoded on a CD-ROM or floppy disk, or alternatively could be read by the user from the network via the modem device 52.

Figure 10:
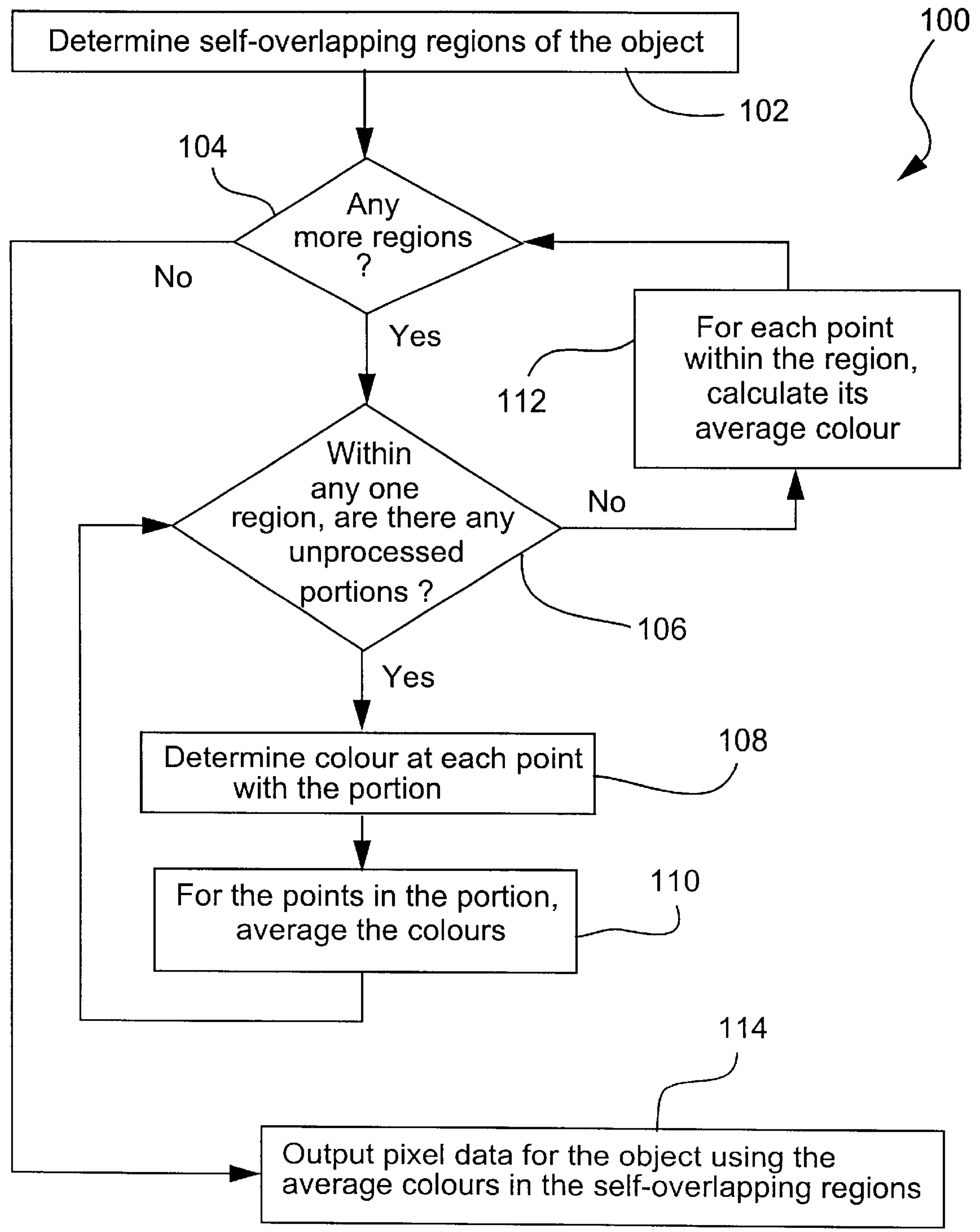
FIG. 10 depicts the method steps performed in one embodiment.

FIG. 10 indicates the various method steps 100 implemented in one embodiment. The method 100 commences at step 102 where a graphic object forming part of the image to be rendered is examined to determined those regions of the object that are self-overlapping. As indicated above, this is preferably performed using the non-zero winding method. This is followed by step 104 where a determination is made as to whether any such regions require processing. If so, step 106 follows which examines if any portions of the region require processing. A single overlap provides two portions and a double overlap gives three, and so on. If so, the colour at each point (eg. pixel) within the position is examined at step 108 and at step 110 that colour is accumulated with colours at the same point locations from other portions in the region. After step 110, control returns to step 106. It will be apparent from this process that the averaging over the portions in a region can be performed progressively without a need to simultaneously store each pixel value for each location for each portion. When step 106 determines all portions in a region have been processed, the average colour for each point in the region is calculated at step 112. When there are no more regions, step 104 passes control to step 114 where pixel data for the object including all overlapping and non-overlapping regions are output. The pixel data may be output for display by either the video display 11 or the printer 13. Alternatively, the data may be stored in the memory 46 or using the devices 49. Further, the pixel data may be output to a computer network via the modem 52.

The graphical object being rendered is typically variable in colour and/or opacity. For example the object may be formed of a distorted, tiled or texture-mapped pixel-based image, or any combination of such. The object may also be a spatially or parametrically defined blend of colour and/or opacity. The object may also be a spatially or parametrically defined procedural texture.

Figure 11:
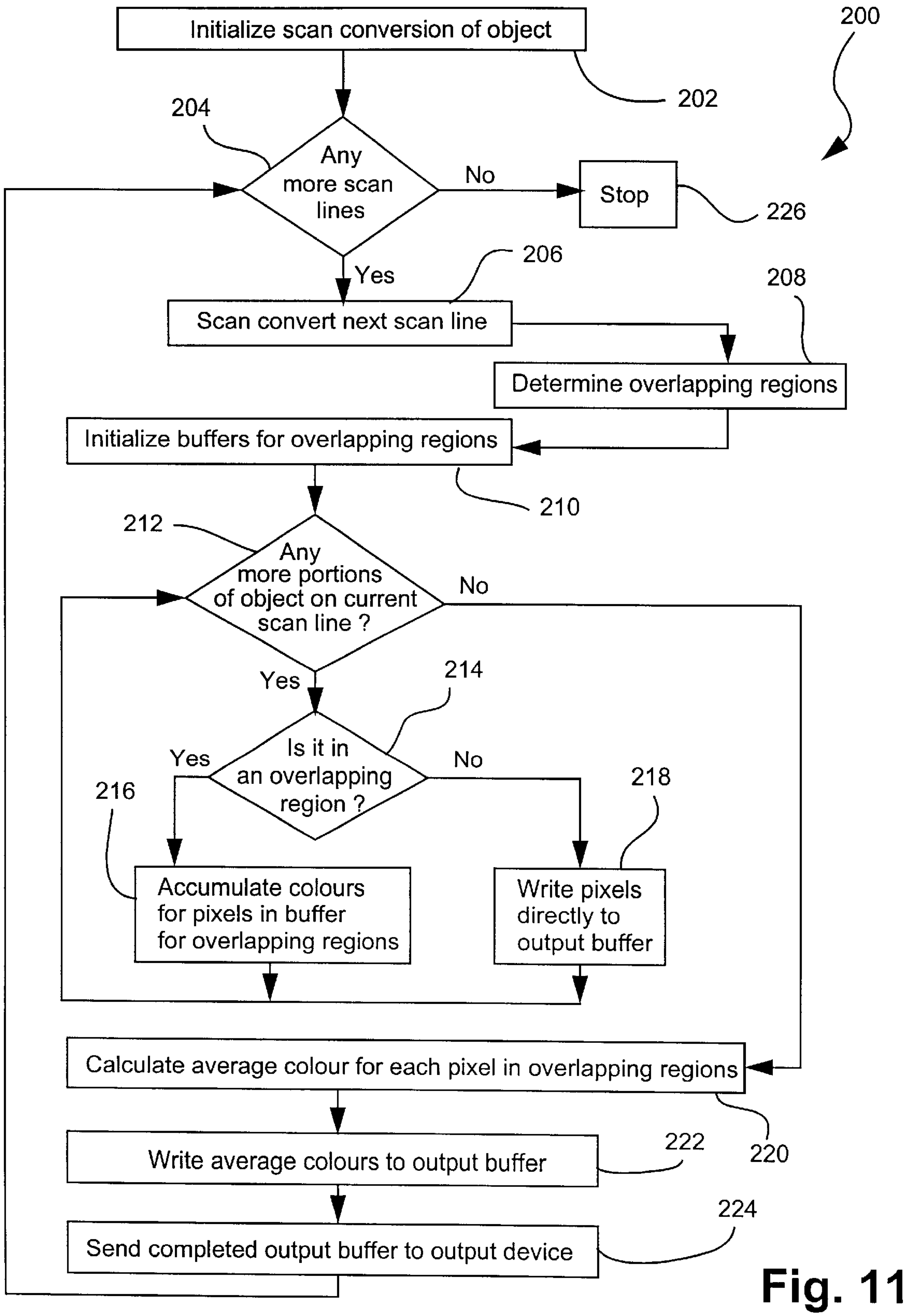
FIG. 11 depicts the method steps performed in a scan-line rendering embodiment.
Figure 1A:
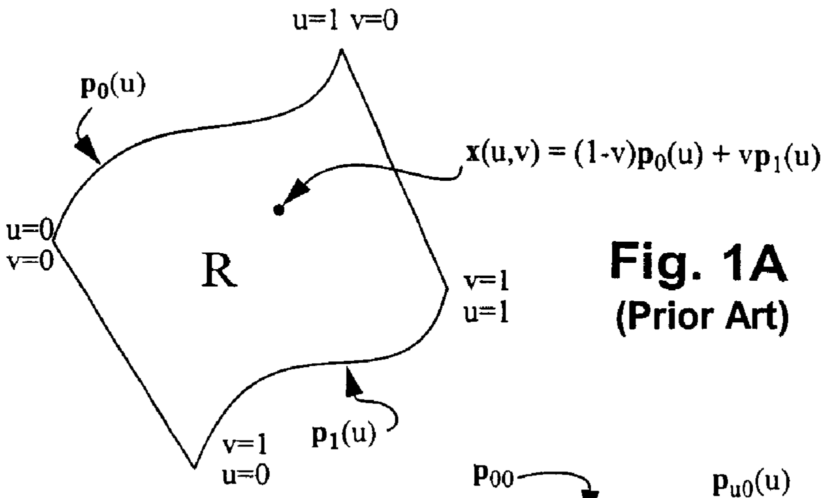
Figure 1B:
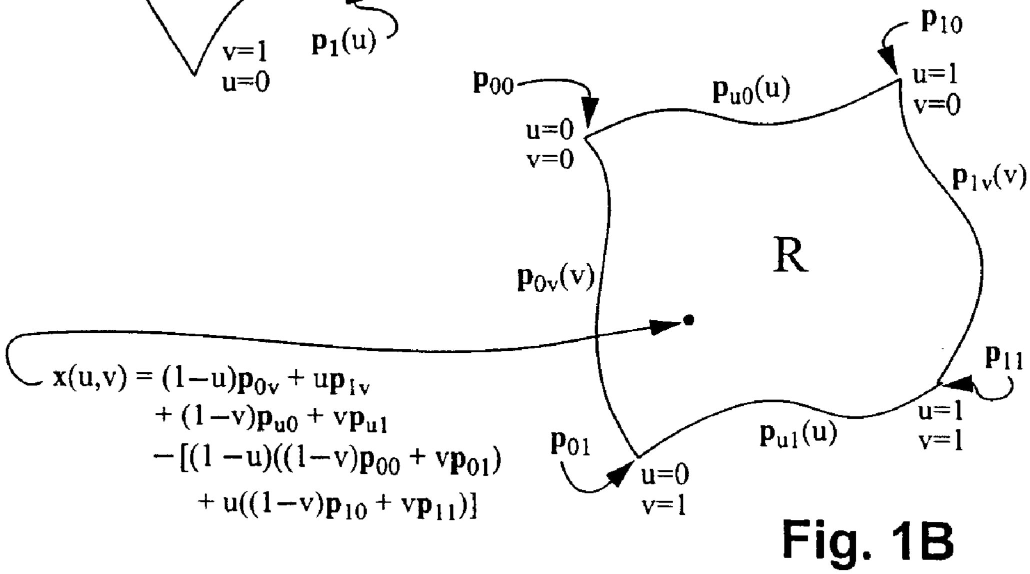
Figure 2A:
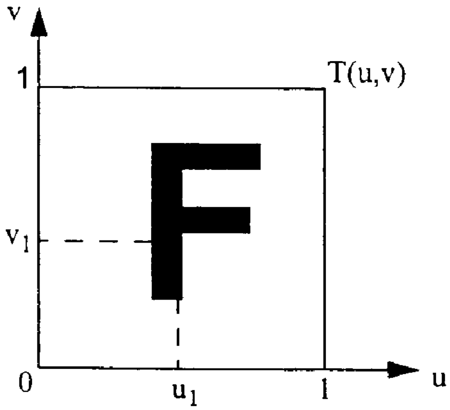
Figure 2B:
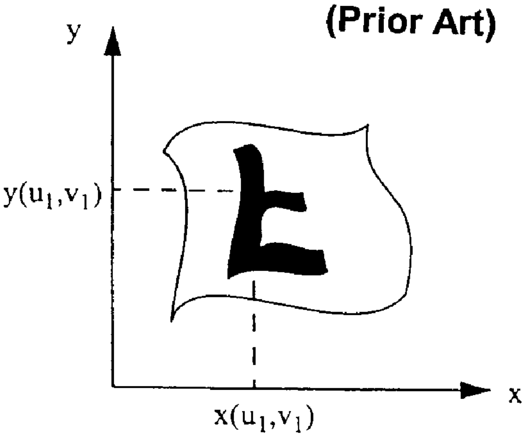
Figure 3A:
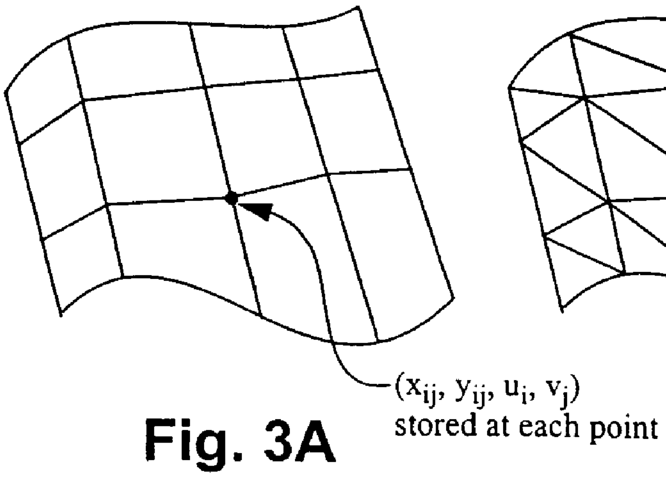
Figure 3B:
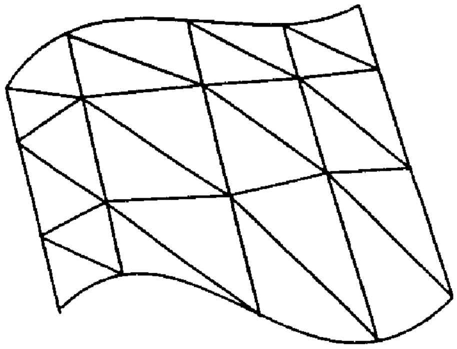
Figure 4:
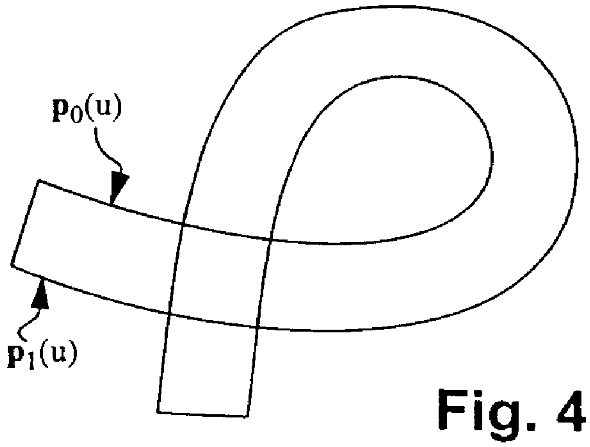
Figure 5A:
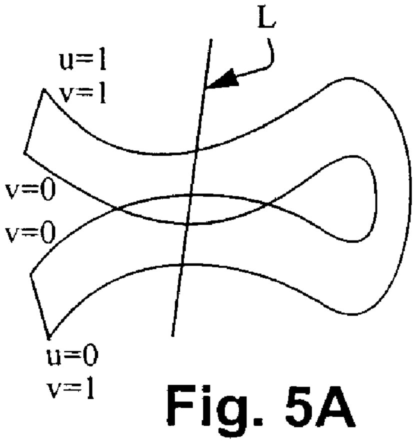
Figure 5B:
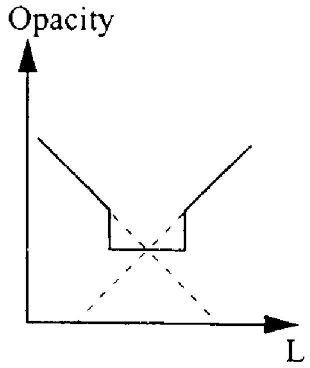
Figure 5C:
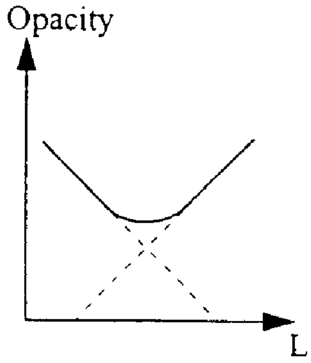
Figure 10:
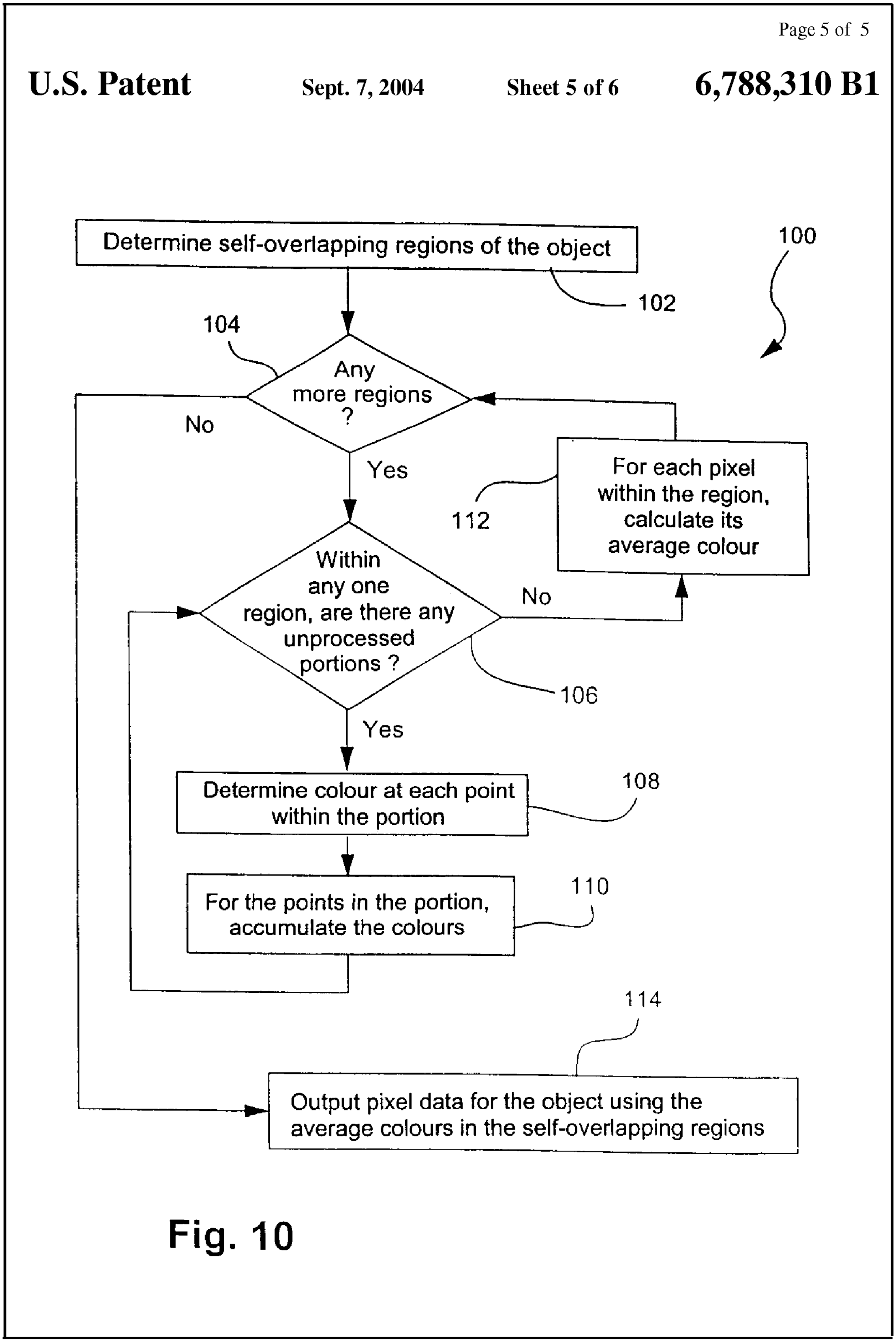

FIG. 11 shows a method 200 for rendering an arbitrary object having overlapping regions in a scan-line manner.

The method 200 commences with step 202 with an initialization for scan conversion of the scan line. Step 204 determines if there are lines remaining for scan conversion and, on a positive response (yes) step 206 scan converts the next scan line. Step 208 which follows determines the overlapping regions within the scan line, and step 210 initializes temporary buffers for the overlapping regions. Step 212 commences a loop which operates on each portion of the object on the current scan line. Step 214 which follows determines if the current portion is an overlapping region determined from step 208. If so, step 216 follows which accumulates the colour of pixels of that portion in the temporary buffer for that overlapping region. Control then returns to step 214 to examine if there are any more portions on the current scan line. If, from step 214, the region is not an overlapping region, step 218 follows which writes the pixel colour values directly to an output buffer. When step 212 determines there are no more portions of the object on the current scan line, step 220 follows to calculate the average colour for each pixel in each overlapping region. Step 222 then writes the average colours to the output buffer and step 224 follows by sending the completed (i.e. filled) output buffer to an output device, such as a printer or display, for reproduction. Control then returns to step 204 for consideration of the next scan line. When all scan lines have been converted, step 226 ceases scan conversion.

The foregoing describes only a number of embodiments of the present invention and modification may be made thereto without departing from the scope of the present invention.

For example, the weighted average opacity determined using Expression (1) may not always be desired. In some instances an unweighted (direct) average may give a desired effect. Further, the colours at the overlap may be combined, in an alternative to average, by for example accumulating their values. Where appropriate, a predetermined clamp level can be used to ensure at least a minimum level of translucency rather than allowing the texture to become wholly opaque.

What is claimed is:

1. A method of determining a displayable colour in a self-overlapping region of a variable colour object, said method comprising the steps of:

determining, for each point in the region, the colour of each portion of the object present at that point;

at each said point, averaging in an order independent manner the colours present at that point; and outputting said averaged colours for reproductions within said region.

2. A method according to claim 1, wherein each said colour includes an opacity component and the average colour at each said point is calculated by weighting each colour by the corresponding opacity, and determining in an order independent manner a resultant opacity.

3. A method according to claim 2, wherein the resultant opacity is determined by adding individual opacities together.

4. A method according to claim 3, wherein said added opacities are clamped to a predetermined level when a sum exceeds said predetermined level.

5. A method according to claim 2, wherein the resultant opacity is determined by evaluating:

$$\underset{i=1}{\overset{n}{over}}\, o_i = \sum_{i=1}^{n} o_i \prod_{j=i+1}^{n} (1 - o_j),$$

wherein the self-overlapping region is overlapped n times, and $o_i$ is the opacity at the point in the $i^{th}$ self-overlapping region.

6. A method according to claim 2, wherein the resultant opacity is determined by averaging the opacity of each said colour.

7. A method according to claim 1, characterised by using the winding fill rule method to determine said self-overlapping region.

8. A method according to claim 7, wherein the winding fill rule method determines said self-overlapping region on a scanline by scanline basis.

9. A method according to claim 8, wherein an array of transition points is used to store those pixels on a scan line that lie within said self-overlapping region.

10. A method according to claim 1, wherein said variable colour object is a distorted and/or tiled and/or textured mapped pixel-based image.

11. A method according to claim 1, wherein said variable colour object is a spatially or parametrically defined blend of colour and/or opacity.

12. A method according to claim 1, wherein said variable colour object is a spatially or parametrically defined procedural texture.

13. A method of determining a displayable colour in a self-overlapping region of a variable colour object, said method comprising the steps of:

determining, for each point in the region, the colour of each portion of the object present at that point;

at each said point, mixing, in an order independent manner, the colours present at that point using a commutative operator; and outputting said mixed colours for reproductions within said region.

14. A method according to claim 13, wherein at least one of said colours comprises an opacity component.

15. A method according to claim 14, wherein said commutative operator is:

$$\left( \frac{\sum c_i o_i / n}{\sum o_i / n},\ \underset{i=1}{\overset{n}{over}}\, o_i \right) = \left( \frac{\sum c_i o_i}{\sum o_i},\ \underset{i=1}{\overset{n}{over}}\, o_i \right),$$

where $$\underset{i=1}{\overset{n}{over}}\, o_i = \sum_{i=1}^{n} o_i \prod_{j=i+1}^{n} (1 - o_j),$$

where $c_i$ and $o_i$ are the colours and opacities respectively at one pixel location within one portion of the self-overlap of said object.

16. A commutative operator for mixing colours having opacity components, said operator being of the form:

$$\left(\frac{\sum c_i o_i / n}{\sum o_i / n}, \underset{i=1}{\overset{n}{over}}\, o_i\right) = \left(\frac{\sum c_i o_i}{\sum o_i}, \underset{i=1}{\overset{n}{over}}\, o_i\right),$$

where $$\underset{i=1}{\overset{n}{over}}\, o_i = \sum_{i=1}^{n} o_i \prod_{j=i+1}^{n} (1 - o_j),$$

and $c_i$ and $o_i$ are the colours and opacities respectively at one pixel location within one portion of a self-overlap of an object.

17. A method of rendering a graphical object, said method comprising steps of:

amassing edge transitions of said object in a scan line by scan line fashion using the non-zero winding fill rule to thereby determine a fill count for regions of the object defined by the edge transitions;

defining regions of said object having a fill count of at least 2 as self-overlapping regions;

determining an output value of a pixel in said self-overlapping regions according to a rule; and determining an output value of a pixel in a non self-overlapping region according to the colour and opacity of said pixel in the non self-overlapping region.

18. A method according to claim 17, wherein said rule is one of:

application of a respective colour average and a respective opacity average to colours and opacities from the self-overlapping regions;

application of an opacity-weighted average to colours and opacities from the self-overlapping regions; or application of an opacity-weighted average with simulated over to colours and opacities from the self-overlapping regions.

19. A method for rendering in a scan-line manner an arbitrary object having at least one overlapping region, said method comprising the steps of:

for each scan line of said object (a) scan converting the object on said scan line;

(b) determining the overlapping regions of said object within said scan line;

(c) initializing an overlap buffer for each said overlapping regions;

(d) for each portion of the object on said scan line (da) determining if said portion is an overlapping region (daa) if so, accumulating the colour of pixels of said portion in the corresponding said overlap buffer;

(dab) if not, outputting the colour of pixels of said portion;

(e) for each overlapping region, calculating an average colour from the corresponding amassed value in said corresponding overlap buffer; and (f) outputting the average colours.

20. A method according to claim 19 wherein said outputting step outputs to an output buffer which comprises a line buffer.

21. An apparatus for determining a displayable colour in a self-overlapping region of a variable colour object, said apparatus comprising:

colour determination means for determining, for each point in the region, the colour of each portion of the object present at that point;

averaging means, responsive to said colour determination means, adapted to average in an order independent manner, at each said point, the colours present at that point; and output means coupled to said averaging means for outputting said averaged colours for reproductions within said region.

22. An apparatus according to claim 21, wherein each said colour includes an opacity component, and wherein said colour determination means further comprises opacity determination means, and wherein said averaging means further comprises opacity weighting means responsive to said determined colours and corresponding opacities, and the average colour at each said point is calculated by weighting each colour by the corresponding opacity, and determining in an order independent manner a resultant opacity.

23. An apparatus according to claim 22, said opacity weighting means further comprising adding means, wherein the resultant opacity is determined by adding individual opacities together.

24. An apparatus according to claim 23, said adding means further comprising clamping means, wherein said added opacities are clamped to a predetermined level when a sum exceeds said predetermined level.

25. An apparatus according to claim 22, wherein said opacity weighting means is adapted to determine the resultant opacity by evaluating:

$$\underset{i=1}{\overset{n}{over}}\, o_i = \sum_{i=1}^{n} o_i \prod_{j=i+1}^{n} (1 - o_j),$$

wherein the self-overlapping region is overlapped n times, and $o_i$ is the opacity at the point in the $i^{th}$ self-overlapping region.

26. An apparatus according to claim 22, wherein said opacity weighting means is adapted to determine the resultant opacity by averaging the opacity of each said colour.

27. An apparatus according to claim 21, characterised by winding fill rule means adapted to use the winding fill rule method to determine said self-overlapping region.

28. An apparatus according to claim 27, wherein the winding fill rule means is further adapted to determine said self-overlapping region on a scanline by scanline basis.

29. An apparatus according to claim 28, wherein the winding fill rule means are further adapted to use an array of transition points to store those pixels on a scan line that lie within said self-overlapping region.

30. An apparatus for determining a displayable colour in a self-overlapping region of a variable colour object, said apparatus comprising:

means for determining, for each point in the region, the colour of each portion of the object present at that point;

means for mixing, in an order independent manner, at each said point, the colours present at that point using a commutative operator; and means for outputting said mixed colours for reproductions within said region.

31. An apparatus according to claim 30, wherein at least one of said colours comprises an opacity component, wherein said commutative operator means is adapted to perform the operation:

$$\left(\frac{\sum c_i o_i / n}{\sum o_i / n}, \overset{n}{\underset{i=1}{over}} o_i\right) = \left(\frac{\sum c_i o_i}{\sum o_i}, \overset{n}{\underset{i=1}{over}} o_i\right),$$

where $$\overset{n}{\underset{i=1}{over}} o_i = \sum_{i=1}^{n} o_i \prod_{j=i+1}^{n} (1 - o_j),$$

where $c_i$ and $o_i$ are the colours and opacities respectively at one pixel location within one portion of the self-overlap of said object.

32. A commutative operator means for mixing colours having opacity components, said operator means adapted to perform the operation:

$$\left(\frac{\sum c_i o_i / n}{\sum o_i / n}, \overset{n}{\underset{i=1}{over}} o_i\right) = \left(\frac{\sum c_i o_i}{\sum o_i}, \overset{n}{\underset{i=1}{over}} o_i\right),$$

where $$\overset{n}{\underset{i=1}{over}} o_i = \sum_{i=1}^{n} o_i \prod_{j=i+1}^{n} (1 - o_j),$$

and $c_i$ and $o_i$ are the colours and opacities respectively at one pixel location within one portion of a self-overlap of an object.

33. An apparatus for rendering a graphical object, said apparatus comprising:

means for amassing edge transitions of said object in a scan line by scan line fashion using the non-zero winding fill rule to thereby determine a fill count for regions of the object defined by the edge transitions;

means for defining regions of said object having a fill count of at least 2 as self-overlapping regions;

means for determining an output value of a pixel in said self overlapping regions according to a rule; and means for determining an output value of a pixel in a non self-overlapping region according to the colour and opacity of said pixel in the non self-overlapping region.

34. An apparatus according to claim 33, wherein said rule is one of:

application of a respective colour average and a respective opacity average to colours and opacities from the self-overlapping regions;

application of an opacity-weighted average to colours and opacities from the self-overlapping regions; and application of an opacity-weighted average with simulated over to colours and opacities from the self-overlapping regions.

35. An apparatus according to claim 33, wherein:

said means for determining the output value of a pixel in said self overlapping regions comprises one of:

means for applying a respective colour average and a respective opacity average to colours and opacities from the self-overlapping regions;

means for applying an opacity-weighted average to colours and opacities from the self-overlapping regions; and means for applying an opactiy-weighted average with simulated over to colours and opacities from the self-overlapping regions.

36. An apparatus for rendering in a scan-line manner an arbitrary object having at least one overlapping region, said apparatus comprising:

for each scan line of said object (a) scan conversion means for scan converting the object on said scan line;

(b) overlapping region detection means for determining the overlapping regions of said object within said scan line;

(c) buffer initialization means for initializing an overlap buffer for each said overlapping regions (d) overlapping region determination means, operative in respect of each portion of the object on said scan line (da) for determining if said portion is an overlapping region (daa) and, if said portion is an overlapping region adapted to accumulate the colour of pixels of said portion in the corresponding said overlap buffer;

(dab) and, if said portion is not an overlapping region, adapted to output the colour of pixels of said portion:

(e) calculation means, operative in respect of each overlapping region, to calculate an average colour from the corresponding accumulated value in said corresponding overlap buffer;

(f) outputting means for outputting the average colours.

37. An apparatus according to claim 36, wherein said outputting means outputs to an output buffer which comprises a line buffer.

38. A computer program product including a computer readable medium incorporating a series of instructions configured to determine a displayable colour in a self-overlapping region of a variable colour object, said instructions comprising:

determination steps for determining, for each point in the region, the colour of each portion of the object present at that point;

averaging steps for, at each said point, averaging in an order independent manner the colours present at that point; and outputting steps for outputting said averaged colours for reproduction within said region.

39. A computer program product according to claim 38, wherein each said colour includes an opacity component, and wherein said colour determination steps further comprise opacity determination steps, and wherein said averaging steps further comprise opacity weighting steps responsive to said determined colours and corresponding opacities, and the average colour at each said point is calculated by weighting each colour by the corresponding opacity, and determining in an order independent manner a resultant opacity.

40. A computer program product according to claim 39, said opacity weighting steps further comprising adding steps, wherein the resultant opacity is determined by adding individual opacities together.

41. A computer program product according to claim 40, said adding steps further comprising clamping steps, wherein said added opacities are clamped to a predetermined level when a sum exceeds said predetermined level.

42. A computer program product according to claim 39, wherein said opacity weighting steps are adapted to determine the resultant opacity by evaluating:

$$\overset{n}{\underset{i=1}{over}}\, o_i = \sum_{i=1}^{n} o_i \prod_{j=i+1}^{n} (1 - o_j),$$

wherein the self-overlapping region is overlapped n times, and $o_i$ is the opacity at the point in the $i^{th}$ self-overlapping region.

43. A computer program product according to claim 39, wherein said opacity weighting steps are adapted to determine the resultant opacity by averaging the opacity of each said colour.

44. A computer program product according to claim 38, characterised by winding fill rule steps adapted to use the winding fill rule method to determine said self-overlapping region.

45. A computer program product according to claim 44, wherein the winding fill rule steps are further adapted to determine said self-overlapping region on a scanline by scanline basis.

46. A computer program product according to claim 45, wherein the winding fill rule steps are further adapted to use an array of transition points to store those pixels on a scan line that lie within said self-overlapping region.

47. A computer program product for determining a displayable colour in a self-overlapping region of a variable colour object, said program comprising:

code for determining, for each point in the region, the colour of each portion of the object present at that point;

code for mixing in an order independent manner, at each said point, the colours present at that point using a commutative operator; and code for outputting said mixed colours for reproductions within said region.

48. A computer program product according to claim 47, wherein at least one of said colours comprises an opacity component, wherein said commutative operator steps are adapted to perform the operation:

$$\left(\frac{\sum c_i o_i / n}{\sum o_i / n}, \overset{n}{\underset{i=1}{over}}\, o_i\right) = \left(\frac{\sum c_i o_i}{\sum o_i}, \overset{n}{\underset{i=1}{over}}\, o_i\right),$$

where $$\overset{n}{\underset{i=1}{over}}\, o_i = \sum_{i=1}^{n} o_i \prod_{j=i+1}^{n} (1 - o_j),$$

where $c_i$ and $o_i$ are the colours and opacities respectively at one pixel location within one portion of the self-overlap of said object.

49. A computer program product comprising commutative operator steps for mixing colours having opacity components, said operator steps adapted to perform the operation:

$$\left(\frac{\sum c_i o_i / n}{\sum o_i / n}, \overset{n}{\underset{i=1}{over}}\, o_i\right) = \left(\frac{\sum c_i o_i}{\sum o_i}, \overset{n}{\underset{i=1}{over}}\, o_i\right),$$

where $$\overset{n}{\underset{i=1}{over}}\, o_i = \sum_{i=1}^{n} o_i \prod_{j=i+1}^{n} (1 - o_j),$$

and $c_i$ and $o_i$ are the colours and opacities respectively at one pixel location within one portion of a self-overlap of an object.

50. A computer program product including a computer readable medium having recorded thereon a computer program for directing a computer to render a graphical object said program comprising:

code for amassing edge transitions of said object in a scan line by scan line fashion using the non-zero winding fill rule to thereby determine a fill count for regions of the object defined by the edge transitions;

code for defining regions of said object having a fill count of at least 2 as self overlapping regions;

code for determining an output value of a pixel in said self overlapping regions according to a rule; and code for determining an output value of a pixel in a non self-overlapping region according to the colour and opacity of said pixel in the non self-overlapping region.

51. A computer program product according to claim 50, wherein said code for determining the output value of a pixel in said self-overlapping regions comprises one of:

code for applying a respective colour average and a respective opacity average to colours and opacities from the self-overlapping regions;

code for applying an opacity-weighted average to colours and opacities from the self-overlapping regions; and code for applying an opacity-weighted average with simulated over to colours and opacities from the self-overlapping regions.

52. A computer program product for rendering in a scan-line manner an arbitrary object having at least one overlapping region, said program comprising:

for each scan line of said object (a) scan conversion steps for scan converting the object on said scan line;

(b) overlapping region detection steps for determining the overlapping regions of said object within said scan line;

(c) buffer initialization steps for initializing an overlap buffer for each said overlapping regions;

(d) overlapping region determination steps, operative in respect of each portion of the object on said scan line;

(da) for determining if said portion is an overlapping region (daa) and, if said portion is an overlapping region, adapted to accumulate the colour of pixels of said portion in the corresponding said overlap buffer;

(dab) and, if said portion is not an overlapping region, adapted to output the colour of pixels of said portion;

(e) calculation steps, operative in respect of each overlapping region, to calculate an average colour from the corresponding accumulated value in said corresponding overlap buffer;

(f) outputting steps for outputting the average colours.

* * * * *

UNITED STATES PATENT AND TRADEMARK OFFICE
CERTIFICATE OF CORRECTION

PATENT NO. : 6,788,310 B1 
DATED : September 7, 2004
INVENTOR(S) : George Politis It is certified that error appears in the above-identified patent and that said Letters Patent is hereby corrected as shown below:

Drawings,
Sheet 1, replace with attached Replacement Sheet;
Sheet 2, replace with attached Replacement Sheet; and
Sheet 5, replace with attached Replacement Sheet.

Column 2,
Line 8, "regions" should read -- region --.

Column 5,
Line 56, "$\mathbf{O}_2$." should read -- $o_2$. --.

Column 6,
Line 2, "$o_1o_2$)." should read -- $o_1o_2$>. --.

Column 7,
Line 30, " $A = \sum_{i=1}^{k} o_i k,$ " should read -- $A = \sum_{i=1}^{k} o_i$ --.

Column 8,
Line 66, "if is odd then" should read -- if *i* is odd then --.

Column 9,
Line 18, "calculate" should read -- calculated --.

Column 13,
Line 52, "region" should read -- region; --.

UNITED STATES PATENT AND TRADEMARK OFFICE

CERTIFICATE OF CORRECTION

PATENT NO. : 6,788,310 B1 
DATED : September 7, 2004 
INVENTOR(S) : George Politis It is certified that error appears in the above-identified patent and that said Letters Patent is hereby corrected as shown below:

Column 16,
Line 14, “regions” should read -- region; --;
Line 17, “line” should read -- line: --;
Line 19, “region” should read -- region: --; and
Line 25, “portion:” should read -- portion; --.

Column 18,
Line 53, “region” should read -- region: --.

Signed and Sealed this

First Day of November, 2005

JON W. DUDAS
*Director of the United States Patent and Trademark Office*